United States Patent
Gottwald

(10) Patent No.: US 7,593,579 B2
(45) Date of Patent: Sep. 22, 2009

(54) METHOD FOR SECURE ENCODING OF DATA

(75) Inventor: Dieter Gottwald, Upper Brookfield (AU)

(73) Assignee: Symantec Corporation, Cupertino, CA (US)

( * ) Notice: Subject to any disclaimer, the term of this patent is extended or adjusted under 35 U.S.C. 154(b) by 994 days.

(21) Appl. No.: 10/827,536

(22) Filed: Apr. 20, 2004

(65) Prior Publication Data

US 2005/0246527 A1   Nov. 3, 2005

(51) Int. Cl.
*G06K 9/36* (2006.01)
*G06K 9/46* (2006.01)

(52) U.S. Cl. ...................................... 382/232
(58) Field of Classification Search ................. 382/232; 715/234, 235, 245, 760; 709/203; 717/106, 717/114
See application file for complete search history.

(56) References Cited

U.S. PATENT DOCUMENTS

| 5,835,712 | A | * | 11/1998 | DuFresne | 709/203 |
| 5,892,905 | A | * | 4/1999 | Brandt et al. | 726/11 |
| 6,092,196 | A | * | 7/2000 | Reiche | 726/6 |
| 6,256,778 | B1 | * | 7/2001 | Oliver | 717/106 |
| 2002/0065912 | A1 | * | 5/2002 | Catchpole et al. | 709/224 |

* cited by examiner

*Primary Examiner*—Phuoc Tran
(74) *Attorney, Agent, or Firm*—Fenwick & West LLP

(57) ABSTRACT

The present invention provides a method of securely encoding and transmitting data using a template to produce an encoded text string. The encoding of the data and the arrangements of the data elements provide a two-fold level of protection and can be decoded in a useable format with the template. Furthermore there is a third level of protection with the incorporation of a check sum in the dataset. The method allows data exchange between two computer programs because of the highly compact nature of the encoded dataset.

16 Claims, 2 Drawing Sheets

| Encoding Set | Function |
|---|---|
| #10 | Decimal digits [0-9] (base 10) |
| #16 | Hexadecimal digits [0-9A-F] (base 16) |
| #24 | Selected alphanumeric characters [BCDFGHJKMPQRTVWXY2346789] (base 24) |
| #26 | Upper case letters [A-Z] (base 26) |
| #34 | Alphanumeric characters [0-9A-HJ-NP-Z] (base 34) |
| #36 | Alphanumeric characters [0-9A-Z] (base 36) |
| #64 | Alphanumeric characters [0-9A-Za-z+/] (base 64) |

Figure 1

| Encoding Set | Function |
|---|---|
| #10 | Decimal digits [0-9] (base 10) |
| #16 | Hexadecimal digits [0-9A-F] (base 16) |
| #24 | Selected alphanumeric characters [BCDFGHJKMPQRTVWXY2346789] (base 24) |
| #26 | Upper case letters [A-Z] (base 26) |
| #34 | Alphanumeric characters [0-9A-HJ-NP-Z] (base 34) |
| #36 | Alphanumeric characters [0-9A-Z] (base 36) |
| #64 | Alphanumeric characters [0-9A-Za-z+/] (base 64) |

Figure 2

| Encoding Length | Function |
|---|---|
| %0 ... %9 | 1 (%0) to 10 (%9) characters |

Figure 3

| Encoding Element | Function |
|---|---|
| :a ... :z | 26 numeric elements; e.g. 32 bit integers |
| :C | Checksum element; e.g. CRC32 |
| :. | Variable-length textual element |

Figure 4

| Encoding Attribute | Function |
|---|---|
| $c | Include a check digit per element |
| $s | Scramble the element prior to encoding |

Figure 5

| Element Type | Element Description | Example Value |
|---|---|---|
| Card Type | represented by a single letter, e.g. American Express (A), Barclays (B), Diners (D), Master (M), Visa (V), etc. | Z |
| Card Number | Up to 24 decimal digits | 1234 5678 9012 3456 7890 1234 |
| Expiry Date | 2 digits for year + 2 digits for month | 9909 |
| Currency | Unit of currency represented by 3 capital letters (e.g., AUD) | AUD |
| Amount | Amount of transaction; up to 10 decimal digits | 12,345,687.90 |
| Account Holder Name | Name of credit card holder in capital letters | SAM SAMPLE |
| Checksum | 32-bit value transmitted with the dataset to verify transmission, validity between sending and receiving parties. | |

Figure 6

| Element Type | Element Description | Example Value |
|---|---|---|
| Number | Position of item on bill; up to 3 decimal digits | 1 |
| Count | Number of items; up to 3 decimal digits | 500 |
| SKU/ID | Unique item identifier; up to 10 decimal digits | 4567 |
| Unit Price | Price per item; up to 10 decimal digits | 12,345.67 |
| Description | Item description; alphanumeric | 125 gram Yummy |
| Checksum | 32-bit value transmitted with the dataset to verify transmission validity between sending and receiving parties | |

METHOD FOR SECURE ENCODING OF DATA

FIELD OF INVENTION

The present invention relates to the secure encoding and electronic transmission of data by encoding sets of related data items into compact text strings. The present invention has particular but not exclusive application for financial transactions, product activation and registration and other types of program-to-program communications.

BACKGROUND

A number of methods and technologies have been developed to handle the transmission of data depending on the intended use of the data. For example, XML (Extensible Markup Language) allows the sender to construct common information formats and share both the format and the data on the World Wide Web, intranets, and elsewhere. Computer makers may agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. Another example is ASN.1 (Abstract Syntax Notation One), which is a standard way to describe a message (unit of application data) that can be sent or received in a network. ASN.1 has two parts: (1) the rules of syntax for describing the contents of a message in terms of data type and content sequence or structure and (2) how you actually encode each data item in a message. IDL (interface definition language) is a further example, and is a generic term for a language that lets a program or object written in one language communicate with another program written in an unknown language so that new objects can be sent to any platform environment and discover how to run in that environment.

There does not appear to be any methods or technologies that provide secure transmission of sets of related data items, encode the data set in a textual and compact manner with an embedded integrity check and use a single key or template to determine the order and representation of the data.

OBJECT OF THE INVENTION

It is an object of the present invention to provide a method of encoding data that overcomes one or more of the aforementioned problems.

SUMMARY OF THE INVENTION

In one aspect the present invention broadly resides in a method for secure encoding of data including constructing a template agreed for use by sender and receiver;

encoding data with reference to the template; and decoding the data with reference to the template, wherein said template includes one or more element references, said element reference includes encoding attributes which determine the data element to encode or decode and the representation of each data element; said element references are arranged relative to each other in a format defined by the template.

In another aspect the invention broadly resides in a method for secure encoding of data including constructing a template agreed to for use by sender and receiver;

encoding data with reference to the template; and decoding the data with reference to the template, wherein said template includes one or more element references, said element reference includes encoding elements which describes the encoding of the data and data elements which represents the encoded data; said element references, encoding elements and data elements are arranged relative to each other in a format defined by the template.

In one preferred embodiment one or more data elements are spaced apart by one or more literal elements.

Where the data is to be transmitted, it is preferably transmitted after being encoded with reference to the template.

In another aspect the present invention broadly resides in a method for secure transmission of data including constructing a template agreed for use by sender and receiver;

encoding data with reference to the template;

transmitting the encoded data; and decoding the data with reference to the template, wherein said template includes one or more element references, said element reference includes encoding attributes which determine the data element to encode or decode and the representation of each data element; said element references are arranged relative to each other in a format defined by the template.

In another aspect the invention broadly resides in a method for secure transmission of data including constructing a template agreed to for use by sender and receiver;

encoding data with reference to the template;

transmitting the encoded data; and decoding the data with reference to the template, wherein said template includes one or more element references, said element reference includes encoding elements which describes the encoding of the data and data elements which represents the encoded data; said element references, encoding elements and data elements are arranged relative to each other in a format defined by the template.

Said element references are preferably spaced apart by one or more literal elements.

Preferably each template will vary in the way in which said element references and literal components are arranged. In one preferred embodiment each template varies in the representation used for each data element.

The template in use will depend on the context in which the dataset is used. For example, if the context concerns financial transactions, one of the data elements may be an account number. In contrast, a template used in the context of product activation may include a serial number as a data element.

The template serves to encode and decode the data and determine the order and representation of the individual elements within the template.

Literal components may occur before, between and or/after element references. Literal components are preferably copied literally in the encoding process and are verified character for character during decoding. In the template definition, literal components and element references are preferably distinguished by an established convention such as the use of letters, numbers and a limited set of punctuation characters for literal components and everything outside this set as lead-ins for element references. The representation of the template is preferably independent of the representation of the encoded data set.

Element references preferably specify the encoding details such as character, class, length, encryption flags; while the data element constitutes the data to encode or to recover when decoding, which may be represented as integers or multiples thereof and converted to strings in a variety of bases such as base 10 (decimal), base 16 (hexadecimal), base 24, base 36, base 57, base 64 or any other base suitably represented in a single character. Fixed length strings can be re-encoded into equivalent forms of multiple integers, variable length strings can be compressed and/or re-encoded thereby providing another level of protection and compactness in the encoded representation. The encoded representation is reduced in size by the use of large numerical bases in encoding the data elements.

The template may specify the application of any one of various types of integrity check, which provides a further layer of protection to the data. Preferably any element or combination of elements or another value mutually agreed to by the sender and recipient of the transmission can be used as a mutation seed that permutes selected elements and their encoded form as defined by the template. Mutation methods include, but are not limited to, binary and/or arithmetic operations involving the data element's original input value and one or more mutator values to produce the data element's output value.

BRIEF DESCRIPTION OF THE DRAWINGS

In order that the present invention be more readily understood and put into practical effect, reference will now be made to the accompanying drawings wherein:

FIGS. 1 to 4 are tables that set out an example syntax supporting six character classes;

FIG. 5 is a table that sets out an example data set involved in a credit card transaction; and FIG. 6 is a table that sets out an example data set usable in an itemized shopping list.

DETAILED DESCRIPTION OF THE PREFERRED EMBODIMENT

Due to the large variety of datasets that may be encoded using this method, template definitions can be tailored for each application. The parties that wish to exchange encoded datasets negotiate the characters, which will represent each individual element within the dataset to formulate an individual template. The choice of particular data elements, the arrangement of the elements and the type of encoding of the data provides a high level of encryption against external observation.

Individual elements (for example, account name, credit card number etc) are selected for a template for a particular dataset (of the data to be encoded). Where the data is lengthy or needs protection (such as a credit card number), the data is broken up into multiple elements thereby enhancing the encoding of that element.

Consideration is also given to the case (upper or lowercase), length of each element, and whether separators are to be used. Where separators are not used, encoded datasets will consist of a single uninterrupted string.

In the example syntax, an element reference specifies three, optionally four, aspects of the encoding of an element:
the set of characters used,
the number of characters,
a symbolic reference to the element
and optionally, additional attributes that influence the representation.

The character set used in encoding an element is expressed as one of the symbols given in FIG. 1.

The number of characters with which a data element is encoded is specified as given in FIG. 2. The values 0-9 correspond to numbers 1-10 respectively. That is, by way of example, if the length is given as 9 then the data element will be encoded in 10 characters.

The data element to be encoded or decoded is identified by a single character as given in FIG. 3.

The optional encoding attributes supported by the example syntax are as given in FIG. 4.

EXAMPLE 1

Credit Card Transaction

FIG. 5 shows the set of data elements that may be present within an online credit card transaction. The dataset includes card type, card number, card expiry date, currency, amount, cardholder name and checksum.

For the purposes of this example, the element t is used for the card type, elements n, u, m for three portions of the card number (up to eight digits each), element e for the expiry date, element c for the currency, element a for the amount and element C represents the checksum.

Using the template
26%0:t-#10%7:n-#10%7:u-#10%7:m-#10%3:e-#26%2: c-#10%9:a-#16%7:C-
the dataset will be encoded as
Z-12345678-90123456-78901234-9909-AUD-1234567890-25A9DF50-SAM SAMPLE Each data element is encoded in accordance with its element reference. For example, in the above-mentioned credit card transaction, the template instructs that the card number is to be represented in three groups of 8 decimal digits each, separated by the literal component. This first example template produces a text string that preserves all element values in an easily human-readable representation.

Alternatively, using the template
64%4:m$s#34%0:t$s#36%6:C$c#64%4:n$s#16%3: c$s#24%2:e$s#26%6:a$s#64%4:u$s#64:.
the dataset will be encoded as
BBankL0AG7L8WYpzlB0E9F97XPLSEAXTEZ1 AjoC+UMwrHe This second template changes the order of the various data elements, mutates the data elements' original values, represents the mutated values in more compact character sets and as a result produces a more compact overall representation that obscures the transmitted data in a non-trivial fashion.

EXAMPLE 2

Itemized Shopping List

FIG. 6 shows a dataset that may be present on an itemized shopping list. For the purposes of this example, the element n is used for the item number, element c for the item count, element S for the SKU/ID, element u for the unit price and element C represents the checksum.

Using the template
36%6:C$c#34%1:n$s#16%7:S$s#16%7:u$s#24%2: e$s#64:.
the dataset will be encoded as
0CEY196O751E8F424DE343895DKQWV1H8U/ 1fnSA9

This example template represents the dataset in a highly compact and encrypted form suitable for storage and/or transmission.

On the other hand, using the template
ItemNo #10%2:n\n

Count #10%2:c\n
SKU #10%9:S\n
UnitPrice #10%9:u\n
Description:.
the dataset will be encoded as
ItemNo 001
Count 500
SKU 0000004567
UnitPrice 0001234567
Description 125 gram Yummy In this example the template specifies literal components and encoding attributes aimed at representing the dataset in a tabular and readable form suitable for printing.

Advantages

An advantage of the present method of securely encoding and transmitting data using a template to produce an encoded text string is that the encoding of the data and the arrangements of the data elements provide a two-fold level of protection and can be decoded in a useable format with the template. Furthermore there is a third level of protection with the incorporation of a check sum in the dataset. The method allows data exchange between two computer programs and because of the highly compact nature of the encoded dataset, it can be transmitted quickly and efficiently.

Varations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A method for secure encoding of datasets for transmission from a sender to a receiver, the method implemented by a computer having a processor, the method comprising:
   constructing a template based on one of a plurality of datasets selected for transmission by the sender to the receiver, the selected dataset comprising a plurality of data elements to be encoded that are a subset of the selected dataset, each data element being represented by at least one element reference in the template and each element reference defining at least one aspect of the encoding of the data element using the template, and wherein at least one of the element references specifies including a check digit along with an encoded form of its corresponding data element;
   encoding each data element according to its corresponding element reference in the template; and
   generating an encoded data representation of the dataset in a textual and compact manner by arranging the encoded data elements in an order specified by the template for secure transmission to the receiver.

2. The method of claim 1 wherein the element references are spaced apart by one or more literal elements.

3. The method of claim 1, wherein the aspect of the encoding of the data element defined by the element reference associated with the data element includes at least one of an encoding set, an encoding length, an encoding element and one or more encoding encryption flags.

4. The method of claim 3, wherein the aspect is an encoding set, and the encoding set is a set of encoding characters for the template that represent characters of a given data element.

5. The method of claim 4, wherein the set of encoding characters include designated encoding characters for representing characters of the data element selected from the group consisting of: decimal digits, hexadecimal digits, selected alphanumeric characters, and upper case letters.

6. The method of claim 3, wherein the aspect is an encoding length, and the encoding length is one or more encoding characters for the template that represent the actual number of characters of a given data element.

7. The method of claim 3, wherein the aspect is an encoding element, and the encoding element is a checksum element.

8. The method of claim 3, wherein the aspect is an encoding encryption flag, and the encoding encryption flag specifies including a check digit for each data element.

9. The method of claim 3, wherein the aspect is an encoding encryption flag, and the encoding encryption flag specifies scrambling of a given data element prior to encoding the element.

10. The method of claim 1, further comprising decoding the encoded data according to the constructed template.

11. The method of claim 1, wherein the selected dataset is for a product activation application, and at least one of the data elements to be encoded is a serial number.

12. The method of claim 1, wherein the selected dataset is for an itemized shopping list application, and at least one of the data elements to be encoded is an item number.

13. The method of claim 1, wherein the selected dataset is for a financial transactions application, and at least one of the data elements to be encoded is an account number.

14. The method of claim 1, wherein the encoded data representation is reduced in size by the use of large numerical bases.

15. The method of claim 1, wherein the data element has an original numeric base and the data element in the encoded data representation is represented in a numerical base that is different from the original numeric base.

16. The method of claim 1, further comprising securely transmitting the encoded data representation from the sender to the receiver.

* * * * *